(12) United States Patent
Park (10) Patent No.: US 12,536,499 B2
(45) Date of Patent: Jan. 27, 2026

(54) LOGISTICS AUTOMATION SYSTEM AND OPERATING METHOD THEREOF

(71) Applicant: COLOSSEUM CORPORATION, INC., Seoul (KR)

(72) Inventor: Jinsu Park, Seoul (KR)

(73) Assignee: COLOSSEUM CORPORATION, INC., Seoul (KR)

( * ) Notice: Subject to any disclaimer, the term of this patent is extended or adjusted under 35 U.S.C. 154(b) by 196 days.

(21) Appl. No.: 18/530,131

(22) Filed: Dec. 5, 2023

(65) Prior Publication Data
US 2025/0148416 A1 May 8, 2025

(30) Foreign Application Priority Data
Nov. 7, 2023 (KR) .......................... 10-2023-0153121

(51) Int. Cl.
*G06Q 10/087* (2023.01)
*G06Q 10/08* (2024.01)

(52) U.S. Cl.
CPC ................................. *G06Q 10/087* (2013.01)

(58) Field of Classification Search
CPC .... G06Q 10/087; G06Q 10/047; G06Q 10/08; G06Q 10/0875; G06Q 10/0631; G06Q 10/0633; G06Q 10/10; G01G 19/00; G06N 20/00
See application file for complete search history.

(56) References Cited

U.S. PATENT DOCUMENTS

| 12,063,092 B2 * | 8/2024 | Huang ................ H04W 12/06 |
| 12,106,236 B2 * | 10/2024 | Singh ..................... G06Q 10/08 |
| 2021/0387805 A1 * | 12/2021 | Singh ..................... G06Q 10/04 |

FOREIGN PATENT DOCUMENTS

| JP | 6938097 B2 | 9/2021 | |
| KR | 10-2018-0073221 A | 7/2018 | |
| KR | 10-2022-0167175 A | 12/2022 | |
| KR | 10-2508630 B1 | 3/2023 | |
| KR | 10-2023-0074875 A | 5/2023 | |
| WO | WO-2021053415 A1 * | 3/2021 | ........... G06Q 10/087 |

OTHER PUBLICATIONS

Office Action for KR 10-2023-0153121 by Korean Intellectual Property Office dated Jan. 15, 2025.

* cited by examiner

*Primary Examiner* — Garcia Ade
(74) *Attorney, Agent, or Firm* — BROADVIEW IP LAW, PC (57) ABSTRACT

Proposed are a logistics automation system and an operating method thereof. The logistics automation system includes a processor, a memory configured to load a computer program executed by the processor, and a storage configured to store the computer program, wherein the computer program comprises instructions for performing an operation for receiving at least one order, an operation for allocating product picking tasks for the at least one order, an operation for setting a picking route according to a predefined criterion for the allocated product picking tasks, and an operation for transmitting guide information about the allocated product picking tasks to a worker terminal, wherein the guide information includes information about product picking location of a product loading area.

20 Claims, 10 Drawing Sheets

| Aisle 1 | | Aisle 2 | | | Aisle 3 | | Aisle 4 | |
|---|---|---|---|---|---|---|---|---|
| Odd number | | Even number | Odd number | | Even number | Odd number | Even number | Odd number |
| 51 | | 52 | 51 | 920 | 52 | 51 | 52 | 51 |
| 49 | | 50 | 49 | | 50 | 49 | 50 | 49 |
| 47 | | 48 | 47 | | 48 | 47 | 48 | 47 |
| 45 | | 46 | 45 | | 46 | 45 | 46 | 45 |
| 43 | | 44 | 43 | | 44 | 43 | 44 | 43 |
| 41 | | 42 | 41 | | 42 | 41 | 42 | 41 |
| 39 | | 40 | 39 | | 40 | 39 | 40 | 39 |
| 37 | | 38 | 37 | | 38 | 37 | 38 | 37 |
| 35 | | 36 | 35 | | 36 | 35 | 36 | 35 |
| 33 | | 34 | 33 | | 34 | 33 | 34 | 33 |
| 31 | | 32 | 31 | | 32 | 31 | 32 | 31 |
| 29 | | 30 | 29 | | 30 | 29 | 30 | 29 |
| 27 | | 28 | 27 | | 28 | 27 | 28 | 27 |
| 25 | | 26 | 25 | | 26 | 25 | 26 | 25 |
| 23 | | 24 | 23 | | 24 | 23 | 24 | 23 |
| 21 | | 22 | 21 | | 22 | 21 | 22 | 21 |
| 19 | | 20 | 19 | | 20 | 19 | 20 | 19 |
| 17 | | 18 | 17 | | 18 | 17 | 18 | 17 |
| 15 | | 16 | 15 | | 16 | 15 | 16 | 15 |
| 13 | | 14 | 13 | | 14 | 13 | 14 | 13 |
| 11 | | 12 | 11 | | 12 | 11 | 12 | 11 |
| 9 | | 10 | 9 | | 10 | 9 | 10 | 9 |
| 7 | | 8 | 7 | | 8 | 7 | 8 | 7 |
| 5 | | 6 | 5 | | 6 | 5 | 6 | 5 |
| 3 | | 4 | 3 | | 4 | 3 | 4 | 3 |
| 1 | | 2 | 1 | | 2 | 1 | 2 | 1 |

FIG. 10

LOGISTICS AUTOMATION SYSTEM AND OPERATING METHOD THEREOF

CROSS REFERENCE TO RELATED APPLICATION

The present application claims priority to Korean Patent Application No. 10-2023-0153121, filed on Nov. 7, 2023, the entire contents of which are incorporated herein for all purposes by this reference.

BACKGROUND OF THE INVENTION

Field of the Invention

The present disclosure relates to a logistics automation system and an operating method thereof.

Description of the Related Art

Recently, as online shopping has become popular, logistics and transportation are expanding. Companies operating in logistics and transportation have been systematically processing order information and delivery information in order to receive orders for products from customers and deliver them.

In addition, as the amount of logistics increases rapidly and the speed of delivery becomes more important, logistics companies are operating a logistics automation system that places large quantities of products in logistics centers and enables the products to be transported immediately upon order.

However, since reliability of picking and transportation of logistics is important due to the nature of the work, the picking and transportation are usually handled directly by people, and accordingly, measures to increase the efficiency of such direct handling work are required.

To solve this, methods are required to automate logistics processing to maximize the efficiency of a worker and minimize work time.

SUMMARY OF THE INVENTION

Accordingly, the present disclosure has been made keeping in mind the above problems occurring in the related art, and the present disclosure is intended to propose a logistics automation system and an operating method thereof.

In order to achieve the above objective, according to an aspect of the present disclosure, there is provided a logistics automation system including: a processor; a memory configured to load a computer program executed by the processor; and a storage configured to store the computer program, wherein the computer program comprises instructions for performing an operation for receiving at least one order; an operation for allocating product picking tasks for the at least one order; an operation for setting a picking route according to a predefined criterion for the allocated product picking tasks; and an operation for transmitting guide information about the allocated product picking tasks to a worker terminal, wherein the guide information includes information about product picking locations of a product loading area.

In this case, in the operation for allocating, the at least one order may be allocated to the worker terminal by grouping products according to a predefined criterion. In the predefined criterion, products with the same hash value may be grouped by using a hash value pre-generated by using at least one of product identification information, a product unit (SKU), and a product quantity for the at least one order.

As an embodiment, in the operation for allocating, tasks may be distributed according to a predefined rule by basing the at least one order on properties of the tasks. In this case, the properties of the tasks may include at least one property datum of a loading capacity of a cart used by each worker, weight, a loading location, the number of products, and the number of workers.

Meanwhile, the operation for setting a picking route may include: identifying the product loading area; identifying a start point and an end point of a first aisle on a basis of the allocated product picking tasks; identifying a start point and an end point of a second aisle to which a worker will move after the first aisle; and setting the picking route by connecting the end point of the first aisle with the start point of the second aisle. The product loading area may include one or more moving aisles and one or more product loading bays, and the product loading bays may be numbered alternatingly.

As another embodiment, the operation for setting a picking route may be performed by using at least one property datum of a loading capacity of a cart used by each worker, weight, a loading location, the number of products, and the number of workers. As still another embodiment, in the operation for setting a picking route, an optimal picking route may be set by using a machine learning-based learning model.

In order to achieve the above objective, according to another aspect of the present disclosure, there is provided an operating method of a logistics automation system, the method including: receiving at least one order; allocating product picking tasks for the at least one order; setting a picking route according to a predefined criterion for the allocated product picking tasks; and transmitting guide information about the allocated product picking tasks to a worker terminal, wherein the guide information includes information about product picking locations of a product loading area.

In this case, in the operation for allocating, the at least one order may be allocated to the worker terminal by grouping products according to a predefined criterion. In the predefined criterion, products with the same hash value may be grouped by using a hash value pre-generated by using at least one of product identification information, a product unit (SKU), and a product quantity for the at least one order.

As another embodiment, in the allocating, tasks may be distributed according to a predefined rule by basing the at least one order on properties of the tasks. The properties of the tasks may include at least one property datum of a loading capacity of a cart used by each worker, weight, a loading location, the number of products, and the number of workers.

Meanwhile, the setting of a picking route may include: identifying the product loading area; identifying a start point and an end point of a first aisle on a basis of the allocated product picking tasks; identifying a start point and an end point of a second aisle to which a worker will move after the first aisle; and setting the picking route by connecting the end point of the first aisle with the start point of the second aisle. Here, the product loading area may include one or more moving aisles and one or more product loading bays, and the product loading bays may be numbered alternatingly.

In addition, the setting of a picking route may be performed by using at least one property datum of a loading capacity of a cart used by each worker, weight, a loading location, the number of products, and the number of workers, and an optimal picking route may be set by using a machine learning-based learning model.

The operating method of a logistics automation system may further include: receiving processing results of the allocated product picking tasks from the worker terminal; and updating inventory information on a basis of the processing results.

According to a logistics processing method of the present disclosure, the logistics automation system analyzes order information and performs optimized task allocation in response to the request of a customer terminal, and thus product picking efficiency is maximized and work time is decreased to reduce work burden of workers and improve convenience, thereby enabling rapid and accurate logistics processing.

According to the logistics processing method according to the embodiment of the present disclosure, product loading bays are numbered alternatingly, thereby allowing the position of a worker to be easily determined.

In addition, even when expanding a product loading bay to add entire aisles and rows to an existing product loading area, the aisles can be numbered consecutively without the confusion of a number system, and each of the rows can be numbered according to a rule, thereby increasing the flexibility of bay expansion and enabling systematic bay operation.

In addition, the logistics automation system 200 increases product picking efficiency and implements a product loading area in an expandable form, thereby forming a logistics processing environment that is systemized not only in software but also in hardware and physical spaces.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Below, with reference to the accompanying drawings, embodiments of the present disclosure are explained in detail so that those skilled in the art can easily implement the embodiments. However, the present disclosure may be implemented in several different forms and is not limited to the embodiments described herein. In order to clearly explain the present disclosure in the drawings, parts unrelated to the description are omitted, and similar drawing numbers are assigned to similar parts throughout the specification.

Hereinafter, a logistics automation system and a picking guide method thereof according to embodiments of the present disclosure will be described in detail with reference to the accompanying drawings.

In the embodiments of the present disclosure, for convenience of explanation, management of logistics for packing and transportation will be described as an example. However, the same configuration may be implemented even in various logistics automation systems that manage large amounts of logistics and perform picking operations.

Figure 1:
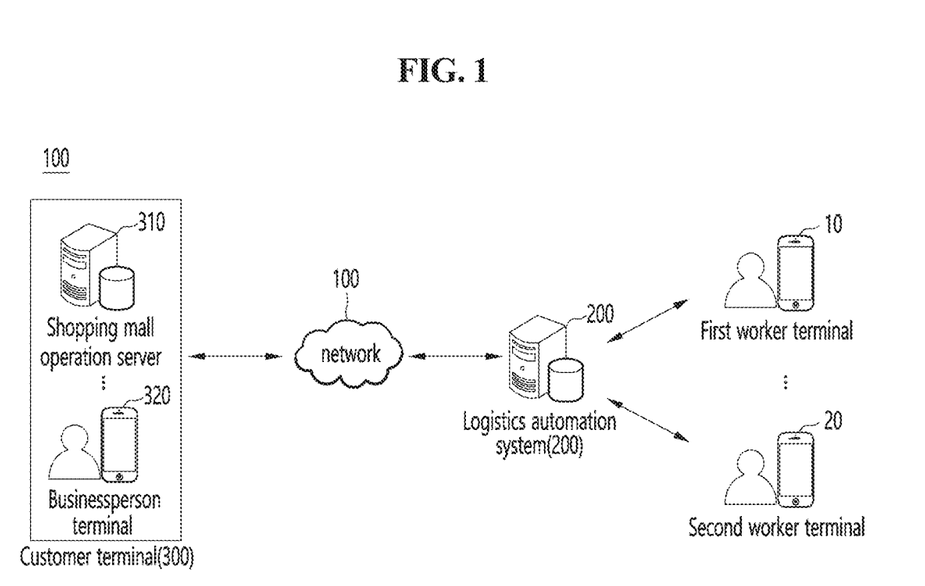
FIG. 1 is a schematic diagram illustrating a logistics processing system and related components according to an embodiment of the present disclosure.

FIG. 1 is a schematic diagram illustrating a logistics processing system and related components according to an embodiment of the present disclosure.

As illustrated in FIG. 1, a logistics processing system 100 includes a customer terminal 300, such as a shopping mall operation server 310 or a businessperson terminal 320 which receives order information from buyers, and includes the logistics automation system 200 and worker terminals 10 and 20 which process logistics by receiving delivery information from customers.

The customer terminal 300 refers to a computing device that receives product orders from buyers through an online platform or offline business place and transmits the product orders to the logistics automation system 200 to request product delivery. For example, the customer terminal 300 includes a computing device provided with the function of transmitting and receiving order information, such as a shopping mall operator's server, an individual businessperson's payment terminal, or a POS system. They may be operated by the same entity as an operator of the logistics automation system 200 or may be operated by a separate entity.

The logistics automation system 200 is a system that receives an order request from the customer terminal 300, performs logistics processing tasks according to order information and delivers products, and performs a comprehensive logistics processing process such as analysis of the order information, assignment of tasks to be processed by workers, and inventory management, etc.

The logistics automation system 200 includes computing devices necessary to perform logistics processing, such as a communication module that transmits and receives order information, a processor that performs logistics processing, and a database that records order processing information. The logistics automation system 200 may be implemented in the form of a single server or in the form of multiple servers and computers operating in cooperation with each other. The components of the logistics automation system 200 will be described later with reference to FIG. 2.

The logistics automation system 200 analyzes order information received from the customer terminal 300 and assigns tasks to maximize work efficiency within a product loading area. The logistics automation system 200 allocates tasks on the basis of a worker's characteristics, order information, and bay information about a product loading area, and generates picking guide information to be transmitted to each worker terminal.

The logistics automation system 200 transmits tasks assigned to at least one worker terminal 10 or 20 and receives processing result information from the worker terminal 10 or 20. Hereinafter, although a first worker terminal 10 among a plurality of worker terminals will be mainly described, the description is not limited to the first worker terminal 10 and another worker terminal 20 may be applied.

The worker terminal 10 refers to a computing device that displays tasks assigned from the logistics automation system 200 and inputs and transmits task processing results when the tasks are completed. The worker terminal 10 may include a software program that performs task processing functions, and hardware devices necessary for performing tasks, such as a display or a touch screen, a keyboard, and a printer.

The worker terminal 10 receives work details assigned from the logistics automation system 200 and displays work information to be performed. A worker can check the task information displayed on the worker terminal 10, perform tasks according to the task information, and input task processing results.

In this way, the logistics automation system 200 analyzes order information received from the customer terminal 300 and allocates tasks to achieve optimal work efficiency, thereby reducing a worker's work performance time and improving work efficiency.

FIG. 1 illustrates an example of a network in which the logistics automation system 200 processes tasks in cooperation with the worker terminal 10, but each of components 10, 20, and 100 may operate in cooperation with other components. Hereinafter, an overall logistics processing method will be described in more detail with reference to FIG. 2.

Figure 2:
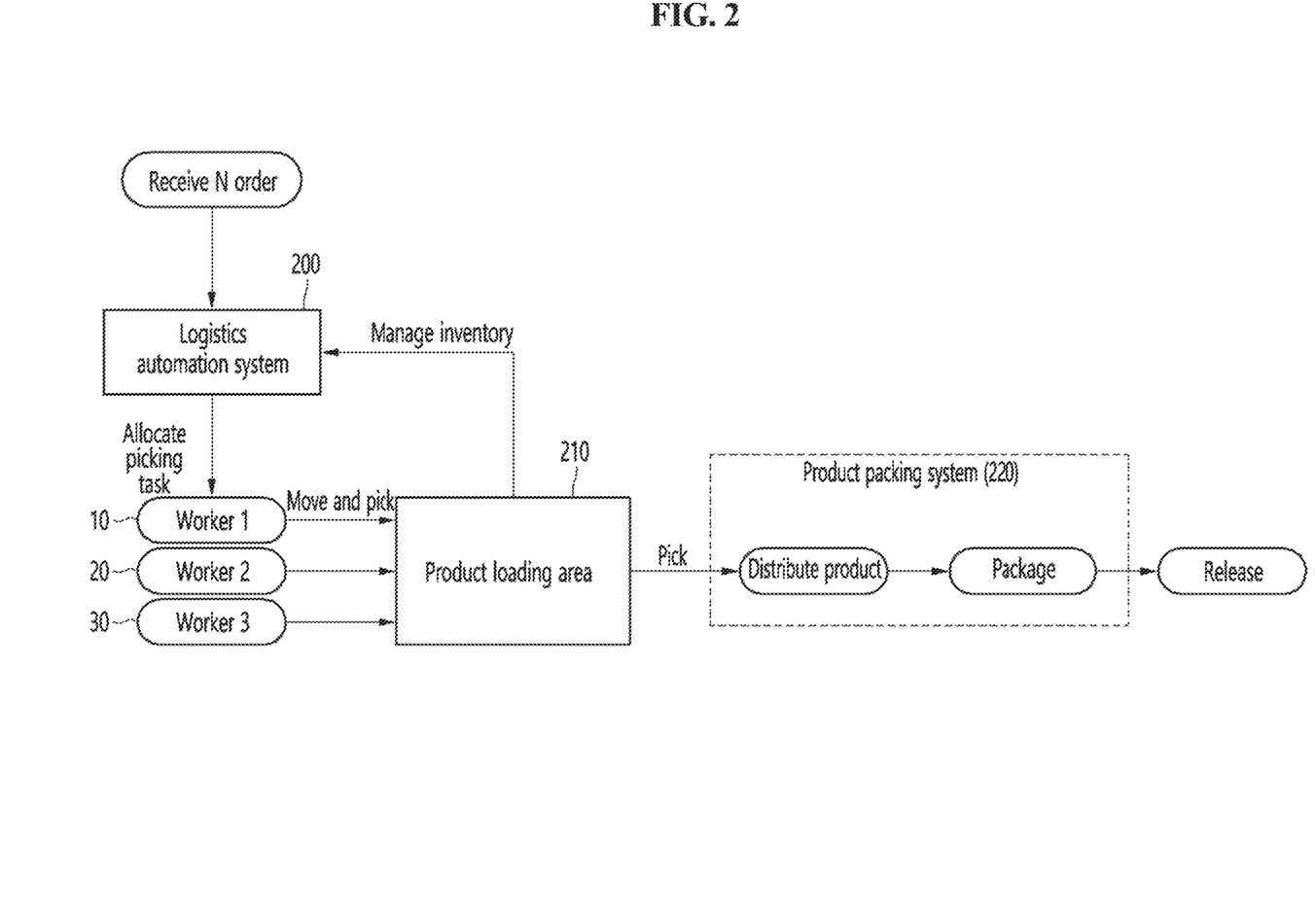
FIG. 2 is a flowchart illustrating a logistics processing method of the logistics automation system according to the embodiment of the present disclosure.

FIG. 2 is a flowchart illustrating the logistics processing method of the logistics automation system according to the embodiment of the present disclosure. The logistics processing method includes the entire process of the logistics automation system 200 assigning tasks to the worker terminals 10 to 30, picking and releasing products. The logistics automation system 200 according to the disclosure of the present may operate in cooperation with a product packing system 220 in addition to the components described in FIG. 1.

First, the logistics automation system 200 receives at least one (N) order received from the customer terminal 300 and allocates the order to the worker terminals 10 to 30. The logistics automation system 200 may receive orders from the customer terminal 300 at every predetermined period or time. Order information includes information for identifying and delivering a product, such as the type, quantity, brand, product name, identification number, and delivery address information of the product to be ordered.

The logistics automation system 200 analyzes accumulated order information. At this time, the logistics automation system 200 considers bay information such as the structure of a product loading area, a movement route, and information about a loaded product. The logistics automation system 200 may extract product identification information from the order information for picking products and recognize a location in the loading area in which the products can be picked. For example, in a case in which there are ten pieces of order information, and all products are placed in different loading areas, the picking order of the products may be determined by setting shortening of a worker's movement route as a top priority.

When the logistics automation system 200 completes the analysis of the order information, the logistics automation system 200 allocates task information to worker terminals 10 to 30. The task information includes information about products, such as information about product picking locations, product names, and quantity, and is output through an interface of each of the worker terminals 10 to 30. Workers with the worker terminals 10 to 30 that have received the assigned task information may move to the product loading area 210 for performing tasks assigned thereto and perform the picking tasks.

The product loading area 210 is a physical bay in which a large amount of products are loaded. A product loading bay is designated according to a predefined method and includes a moving aisle for workers to pick products. Each product loading bay is provided with a bay number so that a worker terminal can easily identify a corresponding area.

Figure 5:
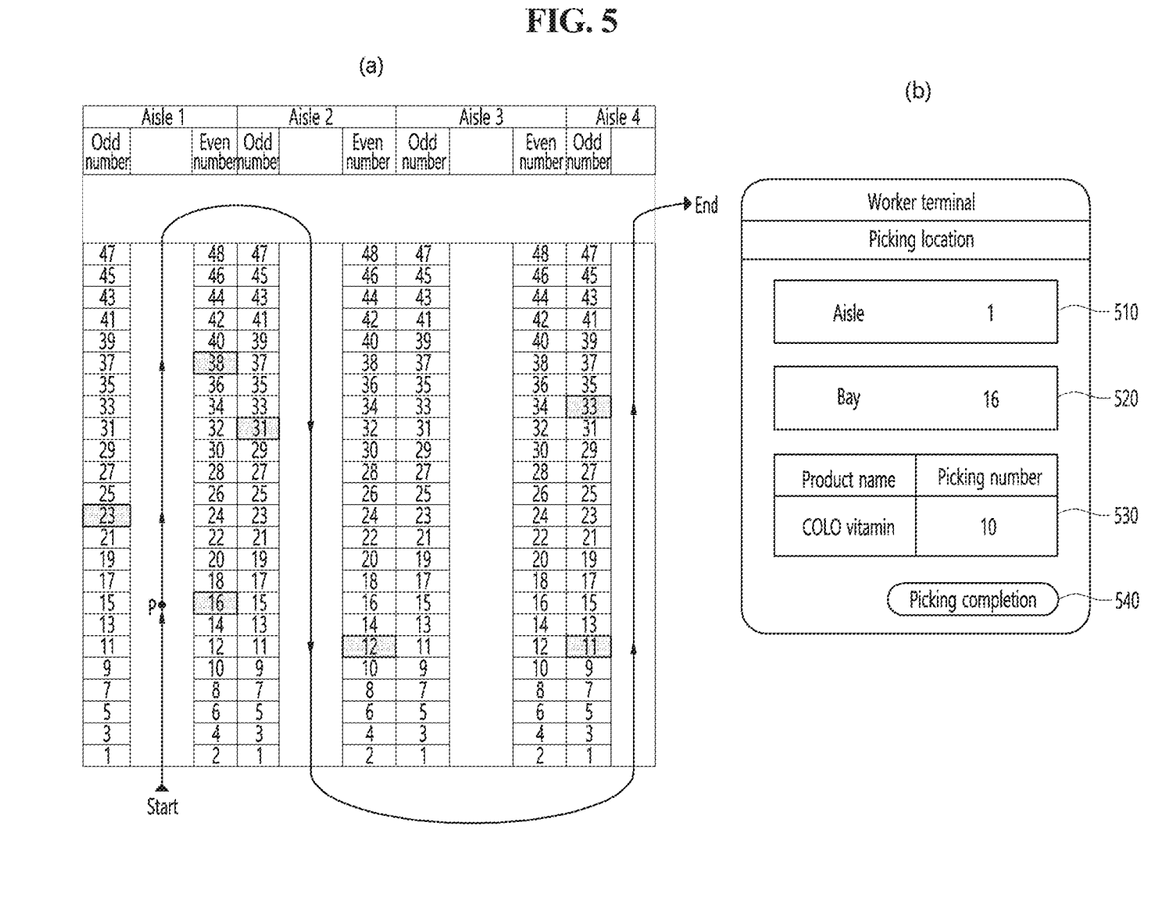
FIG. 5 is example diagrams illustrating a picking guide method according to the embodiment of the present disclosure.

As an embodiment, in the product loading area, identification numbers are assigned to the product loading bay and the moving aisle. Part (a) of FIG. 5 illustrates the product loading area having four aisles (aisles 1 to 4) and two rows of loading bays (numbers 1 to 48) for each of the aisles. That is, in the product loading area, a plurality of loading bays are disposed at opposite sides of each of the aisles, and with the center of the aisle being between the two rows, first-row loading bays may be disposed at a first side of the aisle, and second-row loading bays may be disposed at a second side thereof. In addition, the first-row loading bays and the second-row loading bays may be preset to have numbers increasing alternatingly gradually toward the other end of the aisle from one end of the aisle. According to this method, the first-row loading bays may be numbered in ascending order of odd numbers, and the second-row loading bays may be numbered in ascending order of even numbers.

In the case in which the product loading area is configured by using this alternating number allocation method, even if the loading area is expanded, continuous numbers can be assigned to the expanded area while maintaining the existing numbering system. In addition, when numbers are assigned as in the embodiment of the present disclosure in contrast to assigning numbers from 1 to 26 in a first row and from 27 to 52 in a second row, even in a middle position, it is easy to recognize which column a worker is located in depending on whether a number is odd or even, and since the rows have numbers arranged in an ascending order, it is easy to determine where a worker is located within the range of the numbers assigned to the rows.

A worker is assigned task information for products for which orders have been received, picks the products within the product loading area 210, and delivers the products to the product packing system 220.

The product packing system 220 is a system that distributes and packages the products delivered by the worker and releases the products for delivery. The product packing system 220 may be implemented by including mechanical devices and software programs for distributing and packaging products, and may be handled directly by a worker or automated. Products that have been packaged through the product packing system 220 are released for delivery.

Meanwhile, when product picking is completed in the product loading area 210, the worker terminal 10 transmits product picking result information to the logistics automation system 200. The logistics automation system 200 determines that products in the product loading area have been released according to the product picking result and performs inventory management. In another embodiment, the logistics automation system 200 may monitor the loading or releasing of products by installing a sensor in a product loading bay and may check the number of remaining products to perform inventory management.

In this logistics delivery process, the logistics automation system 200 performs the function of receiving orders and assigning picking tasks to worker terminals, and maximizes the efficiency of picking tasks performed directly by workers so that the work time of an entire process can be shortened.

Figure 3:
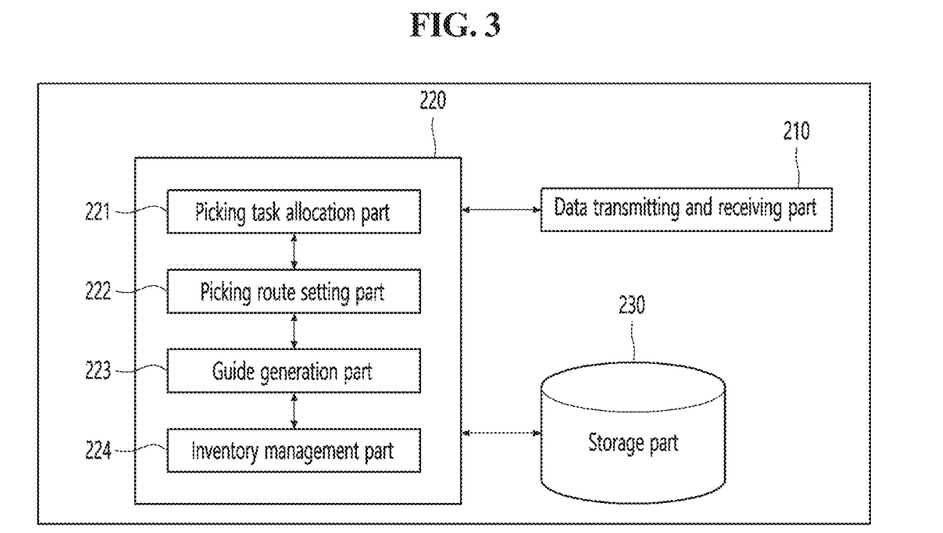
FIG. 3 is a block diagram illustrating the components of the logistics automation system according to the embodiment of the present disclosure.

FIG. 3 is a block diagram illustrating the components of the logistics automation system according to the embodiment of the present disclosure. The logistics automation system 200 includes a processor 220 for task allocation, a data transmitting and receiving part 210, and a storage part 230. The processor 220 includes a picking task allocation part 221, a picking route setting part 222, a guide generation part 223, and an inventory management part 224. These components are components for each function of the logistics automation system 200 and are not necessarily implemented in a separate form. Two or more components may be implemented in an integrated form in one processor. In addition to the components illustrated in the accompanying drawings, various components to implement the logistics automation system 200 of the present disclosure may be included.

The data transmitting and receiving part 210 is a data input/output module that collects order information from the customer terminal 300 and transmits and receives guide information to and from the worker terminal 10, and may be implemented as a transmission/reception module provided with a communication function. The data transmitting and receiving part 210 collects order information from multiple customer terminals 300 at every designated time or cycle and transmits the collected information to the processor 220. In addition, the data transmitting and receiving part 210, with the storage part 230, may store collected data.

The processor 220, which is a module capable of processing tasks predefined by a designer, analyzes collected data to generate the guide information to be transmitted to the worker terminal 10.

The picking task allocation part 221 assigns tasks to enable efficient picking by classifying or grouping the collected order information according to predefined criteria. The picking task allocation part 221 may analyze detailed product information included in N pieces of order information and may organize and allocate tasks to be performed, such as grouping products that can be grouped into one task or including products of a similar category in one task.

The picking route setting part 222 presets the route of picking to be performed by a worker on the basis of a product loading area and allocated picking tasks the picking route. For example, the picking route setting part 222 may designate a place in which an item to be first picked is located in a product loading area as a starting point, designate a place in which an item to be lastly picked is located in the product loading area as an end point, and then preset a route in which a movement flow in the middle can be minimized. For another example, in consideration of the properties of items to be picked, a route may be preset so that heavy and bulky items are picked first and small items are picked later.

The guide generation part 223 generates guide information on the basis of task information allocated in the picking task allocation part 221 and picking route information determined in the picking route setting part 222. Here, the guide information, which is information displayed on each worker terminal, may include guide information about tasks to be performed by a worker and routes, and may be implemented to display detailed guide information each time the tasks are sequentially performed. When the tasks are completed, the worker terminal 10 may transmit work results to the logistics automation system 200.

The inventory management part 224, which is a module configured to manage inventories indicating remaining products in a product loading area, may monitor the release status of products, collect inventory information, and record the loading status of the products. The inventory management part 224 transmits inventory information to an external server (e.g., a shopping mall server) to support the complete sale of products with large inventory through discount events, etc.

The storage part 230 is a database for storing data collected by the data transmitting and receiving part 210 and data processed by the processor, and may be operated as a separate storage or implemented in the form of a memory included in the logistics automation system 200. The storage part 230 may store the loading and releasing records of products and may store information about a logistics processing situation, such as tasks performed by workers and results thereof.

In this way, each of the components of the logistics automation system 200 is organically connected to each other to support the operation of the logistics automation system so that task allocation and logistics processing tasks can be automated.

Figure 4:
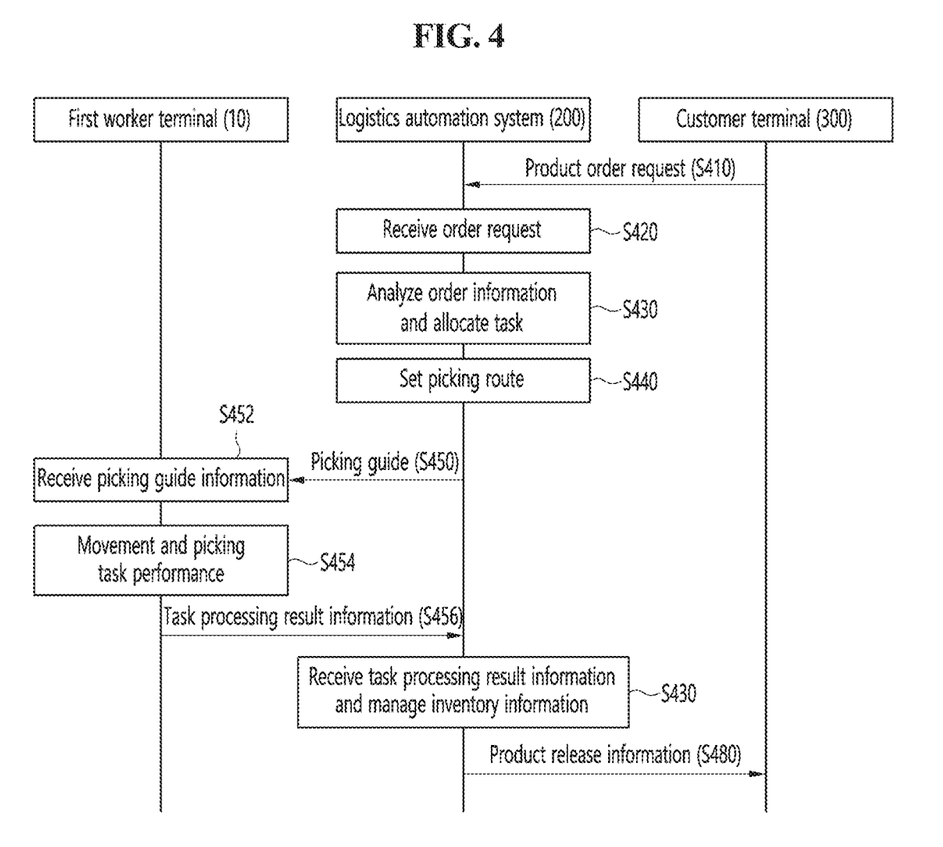
FIG. 4 is a sequence diagram for an operating method of a logistics automation system according to the embodiment of the present disclosure.

FIG. 4 is a sequence diagram for an operating method of a logistics automation system according to the embodiment of the present disclosure.

The operating method of a logistics automation system may be implemented so that the logistics automation system 200 allocates tasks to worker terminals 10 to 30 according to a predefined method.

Specifically, the logistics automation system 200 receives a product order request from the customer terminal 300 at S410 and S420. Here, the product order request includes information such as the name, type, quantity, price, and delivery address of a product by which a product can be identified. The logistics automation system 200 may perform analysis and task allocation for the received product order request in real time or at a predetermined period.

The logistics automation system 200 analyzes order information and assigns a logistics picking task to a worker at S430 according to the predefined method. The logistics automation system 200 may be designed to extract information necessary for task allocation from the order information. For example, the logistics automation system 200 may extract a category, a product name or product number, and order quantity from the order information and determine a task movement flow by using the extracted information.

The logistics automation system 200 uses the analyzed order information and bay information within a product loading area to simulate in advance a task movement flow in which a worker will perform picking tasks within the product loading area, or uses numbers within a product loading area to optimize a task movement flow.

Next, the logistics automation system 200 may set the picking route of products at S440. The logistics automation system 200 may specify the locations of product loading bays by searching product numbers extracted from the order information, and may optimize a task movement flow to perform tasks in ascending order from the lowest number of moving aisles and loading bays so that overlapped task movement flows do not occur when performing picking tasks at the specific locations.

As another embodiment, the logistics automation system 200 may utilize machine learning when allocating tasks. By using a learning module having learned about previously performed tasks, the logistics automation system 200 may be implemented to determine a task movement flow by considering various factors, such as a worker's task characteristics and preferences and the characteristics of products as well as the locations of the product loading bays.

The learning module used at this time, which is a software module performing artificial neural network learning on the basis of existing work data and predefined variables (parameters), performs machine learning on parameters input as learning factors so as to have a learning model capable of generating optimal task information.

The memory included in the logistics automation system 200 may store big data, setting values, and result data used in machine learning, and artificial neural networks may continuously update weight values by learning about predefined parameter items.

When the logistics automation system 200 generates task allocation information for each worker, the logistics automation system 200 transmits picking guide information to a worker terminal 10 at S450 and S452. The picking guide information may include not only picking locations and product information required during tasks, but also a list of tasks to be performed during a predetermined period of time and movement routes within the product loading area 210.

The first worker terminal 10 receives the picking guide information, moves for picking tasks, and performs the picking tasks at S454.

As an embodiment, referring to part (a) of FIG. 5, the first worker terminal 10 may receive a picking guide and display the picking guide on the display of the terminal. The first worker terminal 10 may display on the first worker terminal 10 the picking guide including the locations of products to be picked by a worker (e.g., 16 and 23 of aisle 1, etc.) and the movement route of the aisle within the product loading area.

In addition, as illustrated in part (b) of FIG. 5, the first worker terminal 10 may display detailed picking information on the display. For example, when one picking task is selected from the entire task information of the first worker terminal 10, a detailed picking location and detailed product information may be output. Referring to part (b) of FIG. 5, the first worker terminal 10 displays a picking location of aisle 1 510 and bay 16 520, and may a product name COLO Vitamin and picking quantity of 10 which are display product information 530. A worker performs a picking task according to the displayed information, and when a picking completion button 540 is pressed after the completion of the picking task, a task processing result is transmitted to the logistics automation system 200.

Referring back to FIG. 4, when the picking task is completed, the first worker terminal 10 transmits task processing result information to the logistics automation system 200 at S456. The logistics automation system 200 receives the task processing result information at S470. The logistics automation system 200 may receive the task processing result, monitor product release, and identify inventory status to update inventory information.

As an embodiment, the logistics automation system 200 may receive a task processing result, monitor product release, and then transmit product release information to the customer terminal 300 at S480. Meanwhile, the logistics automation system 200 may receive the task processing result information in real time and assign follow-up tasks, such as modifying a worker's movement route or assigning additional new tasks.

Accordingly, according to the operating method of a logistics automation system of the present disclosure, in response to the request from the customer terminal 300, the logistics automation system 200 analyzes order information and optimizes task allocation so as to maximize task efficiency and shorten task time, thereby improving customer satisfaction and reliability.

Figure 6:
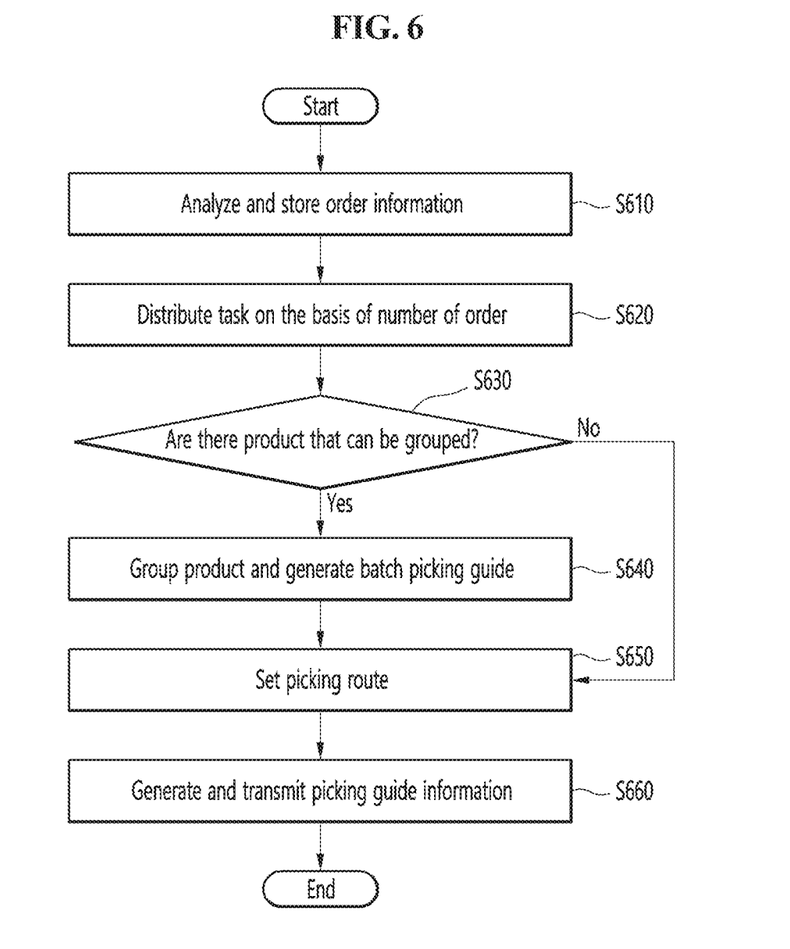
FIG. 6 is a flowchart illustrating an example of the task allocation method of the logistics automation system according to the embodiment of the present disclosure.

FIG. 6 illustrates the task allocation method of the logistics automation system according to the embodiment of the present disclosure. As described above, when receiving an order request, the logistics automation system 200 analyzes order information and assigns tasks to each worker. Hereinafter, an embodiment of a method for allocating tasks by the logistics automation system 200 will be described in detail.

The logistics automation system 200 analyzes the received order information at S610. The order information may include product information such as a product category, a product name or number, and order quantity, etc. and delivery information such as a delivery address.

The logistics automation system 200 may extract necessary information according to a predefined method. For example, when worker groups working on a category of a large product such as 'furniture' or a category of a small product such as 'interior accessories' are different, first, the category information of a product is extracted and classified, and a product name is extracted as subordinate information, so that each product can be searched and product information can be extracted. That is, the logistics automation system 200 analyzes order information such as the type and order of information to be extracted from the order information according to a predefined method.

As one embodiment, the logistics automation system 200 may allocate tasks for each order unit at S620. The logistics automation system 200 may classify and group orders for all orders and assign picking tasks to workers. For example, when there are 100 orders, 20 orders may be assigned to 5 workers, respectively.

Next, the logistics automation system 200 determines whether there are products that can be grouped within the allocated order at S630. The logistics automation system 200 may classify and group products by determining whether there are the products that can be grouped, but may perform picking route setting for assigned tasks at S650 when there are no product that can be grouped.

The logistics automation system 200 may assign tasks to group identical products and pick the products at once on the basis of total product identification information and quantity in collected orders at S640. At this time, the logistics automation system 200 generates and stores a hash value for the product identification information and quantity of each order when receiving the order and searches a storage part on the basis of the hash value when assigning picking tasks so that the picking tasks can be assigned by grouping products with the same hash value. This method is also called a batch picking method.

The logistics automation system 200 may generate a batch picking guide by grouping products. For example, when there are two bottles of shampoo and three bars of soap included in a first order and four bottles of shampoo included in the second order, the batch picking guide may generate a guide to pick four bottles of shampoo and three bars of soap.

When the guide generation for product picking is completed, the logistics automation system 200 sets a picking route at S650. A picking route setting method will be described in more detail with reference to FIGS. 8 and 9.

When task distribution for products and picking route setting are completed, the logistics automation system 200 generates picking guide information, and transmits the guide information to the worker terminal 10.

Figure 7:
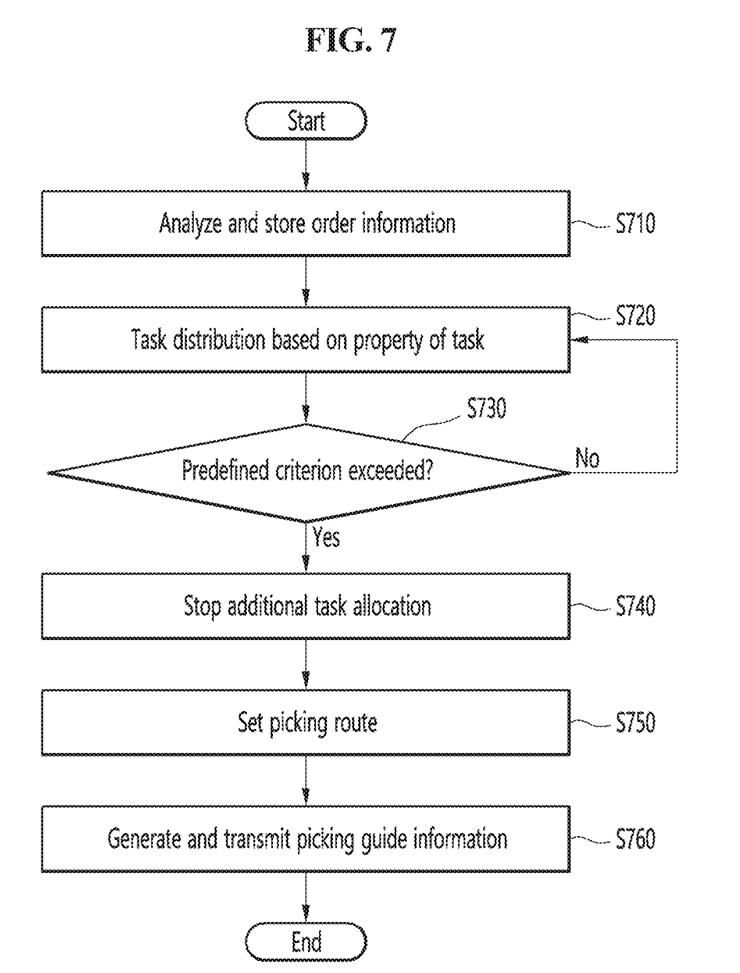
FIG. 7 is a flowchart illustrating an example of the task allocation method of a logistics automation system according to another embodiment of the present disclosure.

FIG. 7 illustrates the task allocation method of a logistics automation system according to another embodiment of the present disclosure. The logistics automation system 200 may allocate tasks on the basis of the attributes of the tasks and products.

The logistics automation system 200 analyzes received order information at S710. The order information may include product information such as a product category, a product name or number, and order quantity, etc. and delivery information such as a delivery address.

The logistics automation system 200 may distribute tasks according to predefined rules on the basis of the properties of the tasks at S720. Here, the properties of the tasks include property data that can serve as a standard for task distribution, such as the loading capacity of a cart used by each worker, weight, a loading location, the number of products, and the number of workers.

The logistics automation system 200 may predefine rules according to the properties of tasks for collected order information and may distribute the tasks according to the rules. For example, on the basis of the maximum loading capacity of a cart used by each worker, the logistics automation system 200 may set a score for small items (e.g., 1 point), a score for medium-sized items (e.g., 3 points), and a score for large items (e.g., 5 points), and then may distribute tasks so that a total task score does not exceed 50 points. That is, the logistics automation system 200 may distribute tasks so as not to exceed a predefined criterion at S730.

For another example, the logistics automation system 200 may set a criterion to distribute tasks for items to be picked at loading locations adjacent to each other to the same worker. For example, products placed in aisle 1 may be distributed to a first worker by taking into account capacity and load limitation.

The logistics automation system 200 performs additional task distribution when the predefined criterion is not exceeded and stops additional task allocation when the predefined criterion is exceeded at S740. When the generation of a guide for product picking is completed, the logistics automation system 200 sets a picking route at S750, generates a picking guide information, and transmits each of the guide information to a worker terminal 10.

Although the task allocation method of the logistics automation system 200 has been described with reference to FIGS. 6 and 7, the task allocation method is not limited to the above-described embodiment. The logistics automation system 200 may utilize an AI system such as machine learning when allocating tasks. By using a learning module having learned about previously performed tasks, the logistics automation system 200 may be implemented to determine a work flow by considering various factors, such as a worker's work characteristics and preferences, and the characteristics of the product, as well as the location of the product loading bay.

The learning module used at this time, which is a software module that performs artificial neural network learning on the basis of existing task data and predefined variables (parameters), may perform machine learning for parameters input as learning factors and may generate optimal task information.

Hereinafter, the picking route setting method of the logistics automation system will be described with reference to FIGS. 8 and 9.

Figure 8:
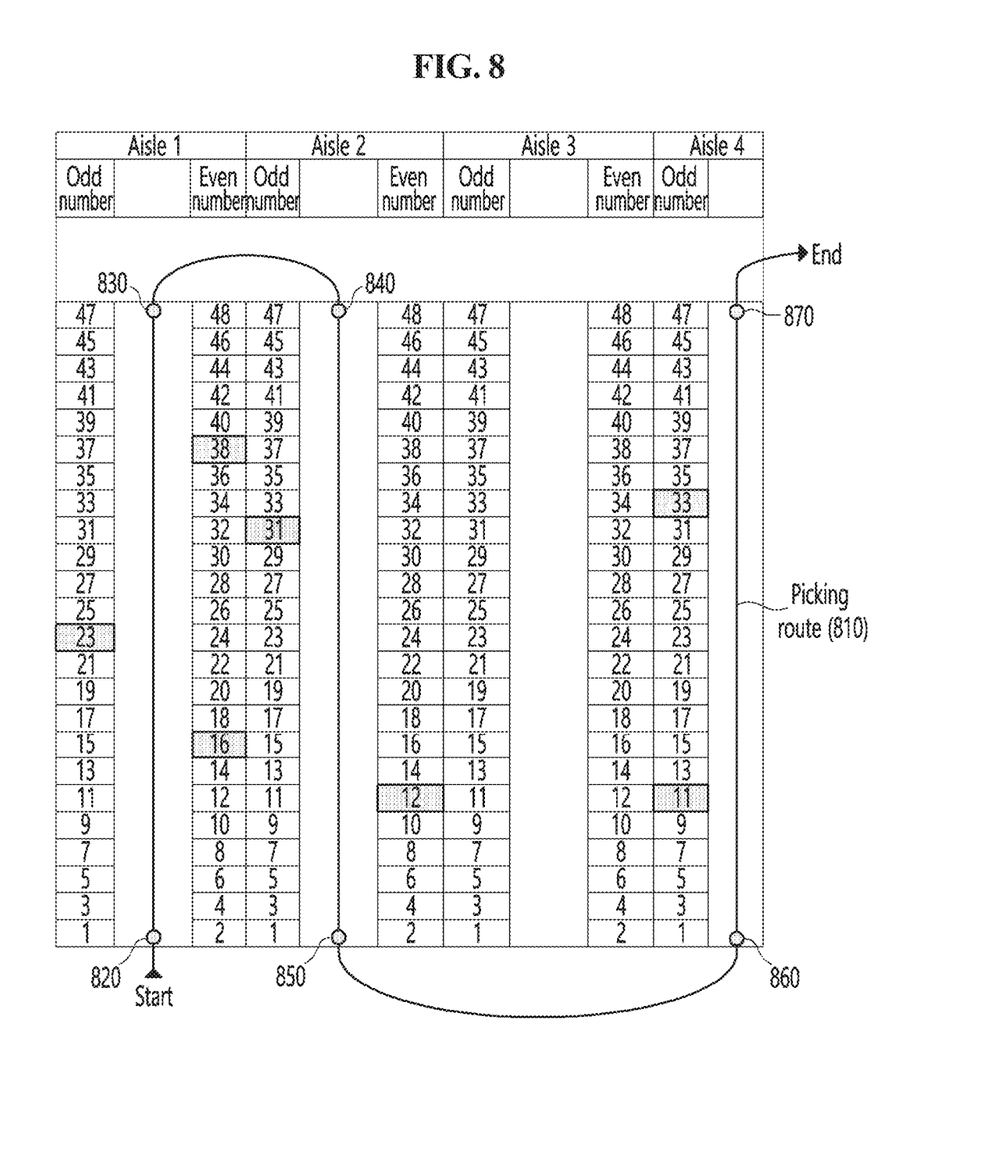
FIGS. 8 and 9 are example diagrams illustrating a picking route setting method of the logistics automation system according to some embodiments of the present disclosure.

FIG. 8 is an example diagram illustrating the picking route setting method of the logistics automation system according to the embodiment of the present disclosure. The logistics automation system 200 determines a picking route based on assigned tasks and bay information of a product loading area.

The logistics automation system 200 may set at least one task route by specifying a start point and end point on the basis of a assigned task. For example, as illustrated in FIG. 8, when products to be picked are loaded in aisles 1, 2, and 4, the logistics automation system 200 sets a first path connecting the start point 820 and end point 830 of aisle 1 to each other. Next, the logistics automation system 200 may set a second route connecting the start point 840 and end point 850 of aisle 2 to each other, which is an aisle adjacent to the aisle 1, and may set a third route connecting the start point 860 and end point 870 of aisle 4 to each other.

The logistics automation system 200 may set an entire picking route 810 by sequentially connecting the first to third routes to each other. This route setting method is performed by considering only the location information of products to be picked, but is not limited thereby.

The logistics automation system 200 may consider not only the location of a product but also properties thereof. For example, since it is desirable to load a heavy and bulky item such as furniture on the lowest end part of a picking cart, a start point may be set on the basis of the location of the item. On the other hand, since it is desirable to load a fragile and small item such as glass crafts on the top part of a picking cart, the location of the item may be set as an end point of a picking route.

Figure 9:
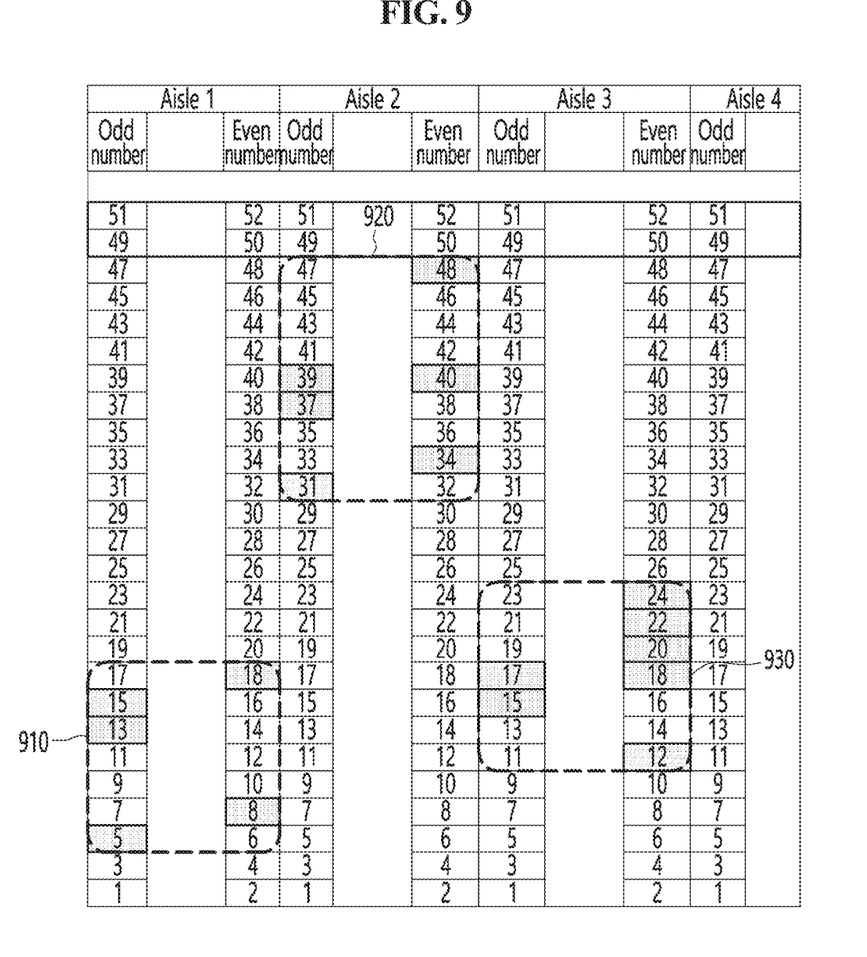

FIG. 9 is an example diagram illustrating a picking route setting method of the logistics automation system according to the another embodiment of the present disclosure. The logistics automation system 200 may assign tasks to group identical products and pick the products at once on the basis of total product identification information and quantity in collected orders.

At this time, the logistics automation system 200 generates and stores a hash value for the product identification information and quantity of each order when receiving the order and searches a storage part on the basis of the hash value when assigning picking tasks so that the picking tasks can be assigned by grouping products with the same hash value.

For this batch picking method, the picking route can be minimized. For example, referring to FIG. 9, when a task 910 of focusing on products that can be picked in aisle 1 is assigned to a first worker, the first worker picks up products from bays 5, 8, 11, 13, and 18 of aisle 1, so bay 5 is a start point and bay 18 is an end point. In this case, the worker's movement route can be minimized.

The logistics automation system 200 may set a route by giving priority to the picking location or properties of a product according to a predefined criterion. When the picking location of a product is a top priority, the logistics automation system 200 may group products located close to each other in aisles and bays so that tasks 910, 920, and 930 can be classified as illustrated in FIG. 9, and may determine a route in consideration of a start point and an end point by considering detailed product locations and product properties within the classified tasks.

As described above, the logistics automation system 200 is capable of setting various routes depending on the location or properties of a product. Without being limited to the above-described embodiments, a method of determining an optimal picking route may be implemented by combining the route setting methods described above or using a machine learning-based learning model.

The logistics automation system 200 may determine task routes by utilizing machine learning. By using a learning module having learned about previously performed tasks, the logistics automation system 200 may be implemented to determine a work flow by considering various factors such as a worker's work characteristics and preferences, and the characteristics of the product, as well as the location of the product loading bay.

Figure 10:
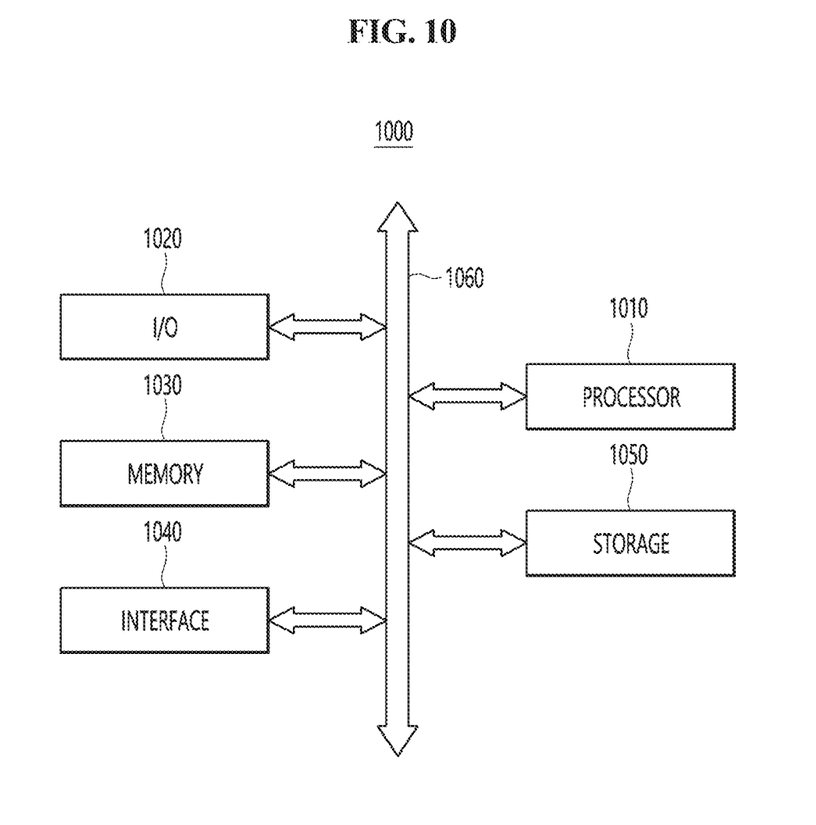
FIG. 10 is a diagram illustrating the hardware configuration of the logistics automation system according to the embodiment of the present disclosure.

FIG. 10 is a diagram illustrating the hardware configuration of the logistics automation system according to the embodiment of the present disclosure. Referring to FIG. 10, the worker terminal 10, 20, or 30 and the logistics automation system 200 may be implemented as an electronic device 1000 that performs a logistics automation method according to some embodiments of the present disclosure.

The electronic device 1000 may include a processor 1010, an input/output (I/O) device 1020, a memory 1030, an interface 1040, a storage 1050, and a bus 1060. The processor 1010, the input/output device 1020, the memory 1030, the interface 1040, and/or the storage 1050 may be coupled to each other through the bus 1060. The bus 1060 is a path through which data move.

Specifically, the processor 1010 may include at least one of a central processing unit (CPU), a microprocessor unit (MPU), a micro controller unit (MCU), a graphics processing unit (GPU), a microprocessor, a digital signal processor, a microcontroller, an application processor (AP), and a logic element that can perform a function similar thereto.

The input/output device 1020 may include at least one of a keypad, a keyboard, a touch screen, and a display device.

The memory 1030 may load data and/or programs. In this case, the memory 1030, which is an operating memory to improve the operation of the processor 1010, may include high-speed DRAM and/or SRAM. The memory 1030 may include one or more volatile memory devices such as double data rate static DRAM DDR (SDRAM) and single data rate SDRAM (SDR SDRAM) and/or one or more non-volatile memory devices such as electrical erasable programmable ROM (EEPROM) and a flash memory.

The interface 1040 may perform a function of transmitting data to or receiving data from a communication network. The interface 1040 may be wired or wireless. For example, the interface 1040 may include an antenna or a wired or wireless transceiver.

The storage 1050 may store and archive data and/or programs. The storage 1050 may include one or more non-volatile memory devices, such as a solid state drive (SSD), a hard drive, or a flash memory. In the present disclosure, the storage 1050 may store a computer program consisting of instructions for performing a method of providing the payment service described above.

The customer terminal 300 or the worker terminal 10 may be applied to a smart phone, a smart pad, a personal digital assistant (PDA), a portable computer, a web tablet, a wireless phone, a mobile phone, a digital music player, a memory card, or all electronic products that can transmit and/or receive information in a wireless environment.

According to the logistics automation system of the present disclosure which is implemented by including these components, efficient picking guide information is provided, thereby reducing the work burden of workers, and convenience is improved, thereby enabling rapid and accurate logistics processing.

In addition, the logistics automation system 200 increases product picking efficiency and implements a product loading area in an expandable form, thereby forming a logistics processing environment that is not only systemized in software but also in hardware and physical spaces.

The above description is merely an illustrative explanation of the technical idea of the present embodiments, and those skilled in the art will be able to make various modifications and variations without departing from the essential characteristics of the present embodiments. Accordingly, the present embodiments are not intended to limit the technical idea of the present embodiments, but rather to explain the technical idea, and the scope of the technical idea of the present embodiments is not limited by the embodiments.

The scope of protection of the present embodiments should be interpreted in accordance with the claims below, and all technical ideas within a scope equivalent thereto should be interpreted as being included in the scope of the claims of the present embodiments.

What is claimed is:

1. A logistics automation system comprising:
a processor;
a memory configured to load a computer program executed by the processor; and
a storage configured to store the computer program,
wherein the computer program comprises instructions for performing an operation for receiving at least one order from a customer terminal;
an operation, by the processor, for analyzing information associated with the at least one order at a logistics automation system;
an operation, by the processor, for allocating product picking tasks to one or more workers for the at least one order based on analyzing the information;
an operation, by the processor, for setting a picking route for the one or more workers according to a predefined criterion for the allocated product picking tasks, wherein the operation for setting the picking route further includes utilizing a machine learning-based learning model to determine worker's work characteristics, and wherein the predefined criterion includes the worker's worker characteristics; and
an operation, by the processor, for transmitting guide information about the allocated product picking tasks to a worker terminal of each worker of the one or more workers,
wherein the guide information comprises information about product picking locations of a product loading area;
an operation, by the processor, for receiving processing results of the allocated product picking tasks from the worker terminal; and
an operation, by the processor, for allocating one or more follow-up product picking tasks to the one or more workers based in part on a location of a product in a loading bay.

2. The logistics automation system of claim 1, wherein in the operation for allocating, the at least one order is allocated to the worker terminal by grouping products according to a predefined criterion.

3. The system of claim 2, wherein in the grouping products according to the predefined criterion, products with the same hash value are grouped by using a hash value pre-generated by using at least one of product identification information, a product unit (SKU), and a product quantity for the at least one order.

4. The system of claim 1, wherein in the operation for allocating, tasks are distributed according to a predefined rule by basing the at least one order on properties of the tasks.

5. The system of claim 4, wherein the properties of the tasks comprise at least one property datum of a loading capacity of a cart used by each worker, weight, a loading location, the number of products, and the number of workers.

6. The system of claim 1, wherein the operation, by the processor, for setting a picking route comprises:
   identifying, by the processor, the product loading area;
   identifying, by the processor, a start point and an end point of a first aisle on a basis of the allocated product picking tasks;
   identifying, by the processor, a start point and an end point of a second aisle to which a worker will move after the first aisle; and
   setting, by the processor, the picking route by connecting the end point of the first aisle with the start point of the second aisle.

7. The system of claim 1, wherein the operation for setting a picking route is performed by using at least one property datum of a loading capacity of a cart used by each worker, weight, a loading location, the number of products, and the number of workers.

8. The system of claim 1, wherein in the operation for setting a picking route, an optimal picking route is set by using the machine learning-based learning model.

9. The system of claim 6, wherein the product loading area comprises one or more moving aisles and one or more product loading bays, and
   the product loading bays are numbered alternatingly.

10. The system of claim 1, further comprising:
    an operation for receiving processing results of the allocated product picking tasks from the worker terminal; and
    an operation for updating inventory information on a basis of the processing results.

11. An operating method of a logistics automation system, the method comprising:
    receiving, by a processor comprising a memory configured to load a computer program, at least one order from a customer terminal;
    analyzing, by the processor, information associated with the at least one order at a logistics automation system;
    allocating, by the processor, product picking tasks to one or more workers for the at least one order based on analyzing information;
    setting, by the processor, a picking route for the one or more workers according to a predefined criterion for the allocated product picking tasks, wherein the operation for setting the picking route further includes utilizing a machine learning-based learning model to determine worker's work characteristics, and wherein the predefined criterion includes the worker's work characteristics; and
    transmitting, by the processor, guide information about the allocated product picking tasks to a worker terminal of each worker of the one or more workers,
    wherein the guide information comprises information about product picking locations of a product loading area;
    receiving, by the processor, processing results of the allocated product picking tasks from the workers terminal; and
    an operation for allocating one or more follow-up product picking tasks to the one or more workers based in part on a location of a product in a loading bay.

12. The method of claim 11, wherein in the operation for allocating, the at least one order is allocated to the worker terminal by grouping products according to a predefined criterion.

13. The method of claim 12, wherein in the grouping products according to the predefined criterion, products with the same hash value are grouped by using a hash value pre-generated by using at least one of product identification information, a product unit (SKU), and a product quantity for the at least one order.

14. The method of claim 11, wherein in the allocating, tasks are distributed according to a predefined rule by basing the at least one order on properties of the tasks.

15. The method of claim 14, wherein the properties of the tasks comprise at least one property datum of a loading capacity of a cart used by each worker, weight, a loading location, the number of products, and the number of workers.

16. The method of claim 11, wherein the setting of a picking route comprises:
    identifying, by the processor, the product loading area;
    identifying, by the processor, a start point and an end point of a first aisle on a basis of the allocated product picking tasks;
    identifying, by the processor, a start point and an end point of a second aisle to which a worker will move after the first aisle; and
    setting, by the processor, the picking route by connecting the end point of the first aisle with the start point of the second aisle.

17. The method of claim 11, wherein the setting of a picking route is performed by using at least one property datum of a loading capacity of a cart used by each worker, weight, a loading location, the number of products, and the number of workers.

18. The method of claim 11, wherein in the setting of a picking route, an optimal picking route is set by using the machine learning-based learning model.

19. The method of claim 16, wherein the product loading area comprises one or more moving aisles and one or more product loading bays, and
    the product loading bays are numbered alternatingly.

20. The method of claim 11, further comprising:
    receiving processing results of the allocated product picking tasks from the worker terminal; and
    updating inventory information on a basis of the processing results.

* * * * *